United States Patent
Schaffer

(10) Patent No.: US 11,138,223 B2
(45) Date of Patent: Oct. 5, 2021

(54) TECHNIQUES FOR UNITING MULTIPLE DATABASES AND RELATED SYSTEMS AND METHODS

(71) Applicant: LiveData, Inc., Cambridge, MA (US)

(72) Inventor: Gabriel Noah Schaffer, Cleveland Heights, OH (US)

(73) Assignee: LiveData, Inc., Cambridge, MA (US)

( * ) Notice: Subject to any disclaimer, the term of this patent is extended or adjusted under 35 U.S.C. 154(b) by 339 days.

(21) Appl. No.: 15/261,310

(22) Filed: Sep. 9, 2016

(65) Prior Publication Data

US 2017/0068718 A1 Mar. 9, 2017

Related U.S. Application Data

(60) Provisional application No. 62/216,297, filed on Sep. 9, 2015.

(51) Int. Cl.
*G06F 16/00* (2019.01)
*G06F 16/27* (2019.01)
*G06F 16/28* (2019.01)
*G06F 16/25* (2019.01)

(52) U.S. Cl.
CPC .......... *G06F 16/27* (2019.01); *G06F 16/258* (2019.01); *G06F 16/284* (2019.01)

(58) Field of Classification Search
CPC ......... G06F 17/30575; G06F 17/30569; G06F 17/30595; G06F 16/258; G06F 16/27; G06F 16/284
See application file for complete search history.

(56) References Cited

U.S. PATENT DOCUMENTS

| | | | | |
|---|---|---|---|---|
| 5,842,173 A * | 11/1998 | Strum | ............... | G06Q 50/22 705/2 |
| 5,899,998 A * | 5/1999 | McGauley | ............ | G06Q 50/24 709/201 |
| 6,199,068 B1 * | 3/2001 | Carpenter | ............... | G01D 4/004 |
| 7,031,956 B1 * | 4/2006 | Lee | ................... | G06F 17/30595 |
| 9,384,202 B1 * | 7/2016 | Tang | ..................... | G06F 16/252 |
| 9,886,483 B1 * | 2/2018 | Harrison | ........... | G06F 17/30587 |
| 10,176,235 B2 * | 1/2019 | Bruce | .................... | G06F 16/18 |
| 2003/0074248 A1 * | 4/2003 | Braud | .............. | G06Q 10/06314 705/7.21 |
| 2005/0050068 A1 * | 3/2005 | Vaschillo | .......... | G06F 17/30569 |
| 2006/0059178 A1 * | 3/2006 | Baron | .............. | G06F 17/30336 |
| 2006/0064327 A1 * | 3/2006 | Simon | .................. | G06F 16/273 705/3 |
| 2007/0226196 A1 * | 9/2007 | Adya | ................ | G06F 17/30457 |
| 2008/0040151 A1 * | 2/2008 | Moore | ................. | G06F 19/324 705/2 |

(Continued)

*Primary Examiner* — Leslie Wong
(74) *Attorney, Agent, or Firm* — Wolf, Greenfield & Sacks, P.C.

(57) ABSTRACT

According to some aspects, a system is providing including a first database, at least one processor configured to communicate with the first database and an external database, and at least one processor-readable storage medium including processor-executable instructions that, when executed, cause the at least one processor to: receive a request from a user via a user interface, translate the request into at least one first operation on the first database and at least one second operation on the external database, and perform the at least one first operation and the at least one second operation.

20 Claims, 12 Drawing Sheets

(56) References Cited

U.S. PATENT DOCUMENTS

| | | | |
|---|---|---|---|
| 2009/0064037 A1* | 3/2009 | Mao | G06F 17/30917 715/810 |
| 2010/0004949 A1* | 1/2010 | O'Brien | G16H 10/60 705/3 |
| 2010/0198608 A1* | 8/2010 | Kaboff | G06Q 10/00 705/2 |
| 2010/0228564 A1* | 9/2010 | Kharraz Tavakol | G06F 19/328 705/2 |
| 2012/0158653 A1* | 6/2012 | Shaffer | G06F 16/27 707/622 |
| 2013/0173306 A1* | 7/2013 | Sasidhar | G06F 16/951 705/3 |
| 2014/0233863 A1* | 8/2014 | Barrington | G06F 17/30268 382/305 |
| 2015/0310179 A1* | 10/2015 | Chengat | G06F 19/00 705/3 |
| 2016/0085914 A1* | 3/2016 | Douglass | G16H 10/60 705/3 |
| 2018/0307735 A1* | 10/2018 | Thayer | G06F 17/30557 |

\* cited by examiner

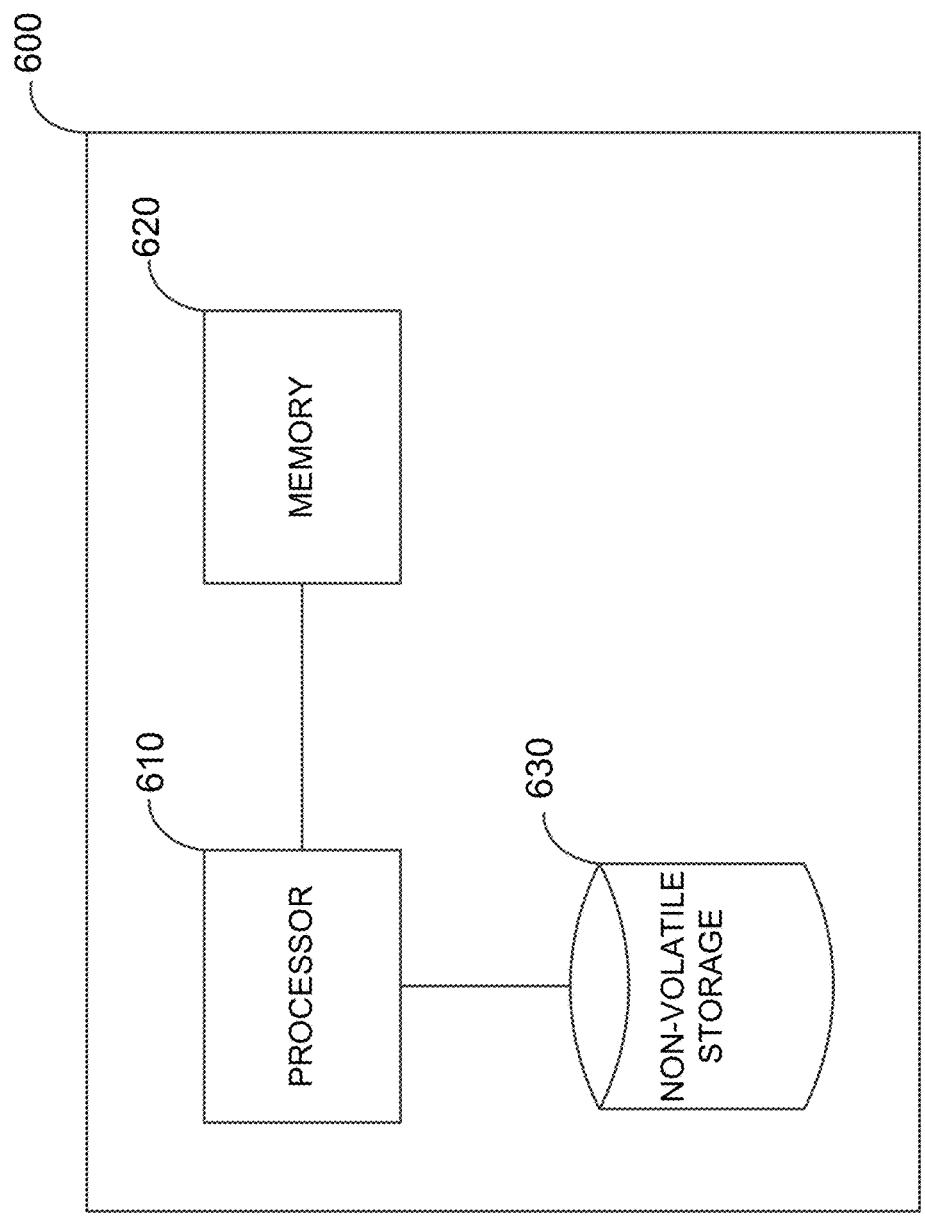

TECHNIQUES FOR UNITING MULTIPLE DATABASES AND RELATED SYSTEMS AND METHODS

CROSS REFERENCE TO RELATED APPLICATIONS

The present application claims the benefit under 35 U.S.C. § 119(e) of U.S. Provisional Patent Application No. 62/216,297, filed Sep. 9, 2015, titled "Techniques For Uniting Relational And Non-Relational Databases And Related Systems And Methods," which is hereby incorporated by reference in its entirety.

BACKGROUND

Early computer databases were generally based on a hierarchical model in which data is organized into a tree-like structure. In a hierarchical database model, data is stored as records, representing nodes of a tree, that are connected to one another via links. To find a given record, the tree must be traversed beginning with a "root" node of the tree, and following the links between records until the given record is located. Beginning around the 1970s, databases became predominantly based on a relational model in which data is organized into tables of rows and columns, with a unique key value for each row. The key values allow links to be established between tables so that arbitrarily complex data relationships can be represented by a set of tables.

SUMMARY

According to some aspects, a system is providing comprising a first database, at least one processor configured to communicate with the first database and an external database, and at least one processor-readable storage medium comprising processor-executable instructions that, when executed, cause the at least one processor to: receive a request from a user via a user interface, translate the request into at least one first operation on the first database and at least one second operation on the external database, and perform the at least one first operation and the at least one second operation.

According to some aspects, a system for synchronizing data between two databases is provided, the system comprising a relational database, at least one communication interface configured to communicate with a second system that comprises a non-relational database, at least one processor, and at least one processor-readable storage medium comprising processor-executable instructions that, when executed, cause the at least one processor to determine, via the at least one communication interface, that data stored in a data field of the non-relational database has been modified, identify, using a data dictionary, one or more data fields of the relational database as corresponding to the data field of the non-relational database, and write the data stored in the data field of the non-relational database to the identified one or more data fields of the relational database.

According to some aspects, a method for synchronizing data between a relational database and a non-relational database is provided, the relational database and non-relational database being located in two different systems that are connected via a communication network, the method comprising determining that data stored in a data field of a non-relational database has been modified, identifying, using a data dictionary, one or more data fields of a relational database as corresponding to the data field of the non-relational database, and writing the data stored in the data field of the non-relational database to the identified one or more data fields of the relational database.

According to some aspects, a method for performing a search of a non-relational database hosted by a first system is provided, the method comprising by a relational database hosted by a second system obtaining a search query, identifying, using a data dictionary, one or more data locations of the non-relational database as corresponding to data fields of the search query, executing, via a communication network that connects the first system and the second system, one or more commands within the first system to obtain data from the identified one or more data locations of the non-relational database, identifying, using the data dictionary, one or more data fields of the relational database as corresponding to data fields of the search query, and merging data from the identified one or more data fields of the relational database with data from the identified one or more data locations of the non-relational database.

The foregoing is a non-limiting summary of the invention, which is defined by the attached claims.

BRIEF DESCRIPTION OF DRAWINGS

Various aspects and embodiments will be described with reference to the following figures. It should be appreciated that the figures are not necessarily drawn to scale. For purposes of clarity, not every component may be labeled in every drawing.

FIG. 6 illustrates an example of a computing system environment on which aspects of the invention may be implemented.

DETAILED DESCRIPTION

Figure 1A:
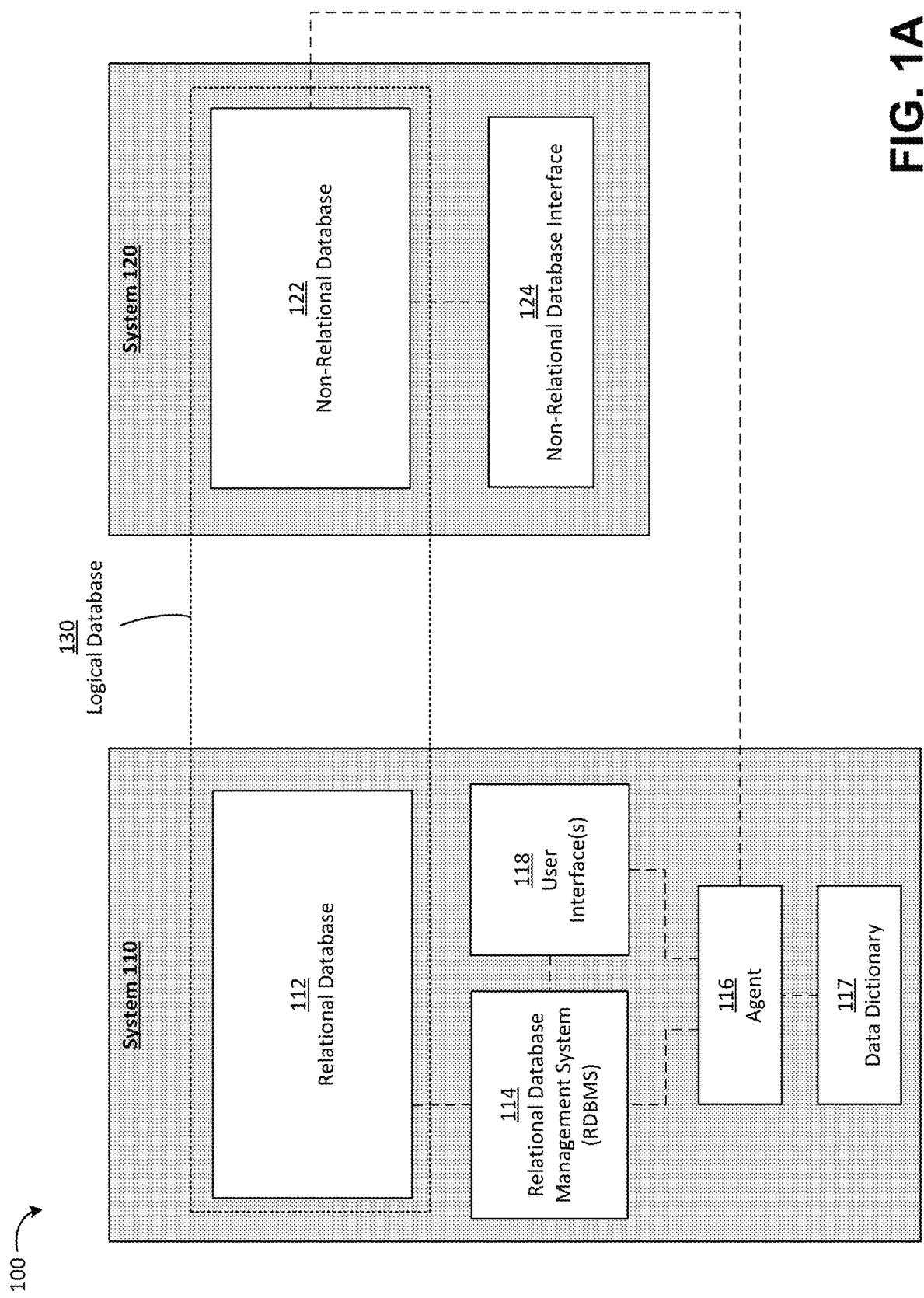
FIG. 1A is a block diagram of an illustrative system that unites a non-relational database and a relational database, according to some embodiments.

Vast amounts of data are stored in legacy database systems that are relied upon by enterprise applications, industries and/or entire fields or institutions. Modernizing such systems is, in many cases, prohibitively expensive both from a time and cost perspective, so that these systems continue to be deployed despite being outdated and using obsolete technology. As a result, updating such systems using current technology (e.g., relational databases, etc.) is difficult if not impossible in many circumstances.

The relational database model has a number of advantages over hierarchical, document based, or other "non-relational" database models. One advantage is that the organized tables of data are generally much easier to understand and to update than a data hierarchy, especially if the hierarchy is complex and/or has a large number of levels. Another advantage is that tables in a relational database can be easily manipulated and linked together (e.g., joined to produce a new table), whereas in a hierarchical database such an operation may require traversing the tree structure many times in many different ways to produce the desired data. Non-relational databases may also lack a simple language that may be used to query the database, whereas relational databases typically make use of structured languages such as SQL (Structured Query Language).

However, for various reasons, including those discussed above, a number of present day institutions continue to utilize databases based on a hierarchical database model. For instance, the U.S. Department of Veteran's Affairs ("the VA") medical system has an electronic health record system named the Veteran's Health Information Systems and Technology Architecture ("VistA"). The VistA system was developed using a programming language named MUMPS (Massachusetts General Hospital Utility Multi-Programming System) that incorporates a hierarchical database system that dates back to the 1960s. While the VistA system and others like it suffer from the disadvantages of a hierarchical database system identified above, such systems may be sufficiently old and their use sufficiently ingrained in an institution that to discard the present system in favor of a more modern system may be, at minimum, a monumental undertaking. The VistA system in particular is used to manage the healthcare of millions of veterans throughout the U.S. within a single network and, as such, it is heavily utilized and has deep roots within the medical establishment.

The inventors have recognized the advantages of being able to integrate legacy systems with modern systems that utilize current technology, allowing the legacy systems to be utilized in a transparent manner to end-users. To this end, the inventors have developed techniques that allow application requests to be translated into one or more operations on a first database (e.g., an enterprise database using current technologies such as a relational database) and one or more operations on a legacy database. According to some embodiments, an agent translates requests into corresponding operations on the first and legacy databases to ensure consistency of the data within and between the respective databases and to maintain data integrity.

The inventors have recognized and appreciated that it would be advantageous if techniques of using a relational database, such as querying the database using a structured language like SQL, could be applied to a non-relational database (e.g., a legacy database system that remains in use and may be critical to an institution). For instance, the ability to view and modify records through an interface that treats the records more like those in a relational database would provide a user with much greater clarity and usability than accessing that data with typical non-relational database techniques.

Since data in a non-relational database is stored in a hierarchical structure, there are limitations as to the number and type of relationships that can be established between data records. That is, records in certain non-relational databases can only be associated with one another by linking them within the database's tree structure (e.g., storing them as parent and child, or as siblings, etc.). Interfaces that access a non-relational database therefore tend to present different regions of the tree structure as distinct sets of data, even though they may be conceptually related. For instance, all data under one node in a non-relational database's tree structure may relate to appointments for a medical system, and each appointment stored under that node may include the name of a patient attending the appointment. Those patients may, however, also have records in the same database that relate to biographical data of the patients. This data may be stored under a patient data node in the tree structure that includes details like the patient's date of birth, social security number, etc. However, since a non-relational database simply stores data organized in a tree, the conceptual relationship between a patient's biographical data and an appointment that the patient has established may not be made explicit within the data. The lack of such relationships can lead to a lack of clarity when viewing and modifying data within such a database.

The inventors have further recognized and appreciated that while techniques of using a relational database with a non-relational database may be advantageous, tools for providing such techniques may not be available to all users of the non-relational database. As such, the inventors have developed techniques for uniting a relational database and a non-relational database in such a way that the combination may be accessed both using traditional tools of the non-relational database and also using new tools developed specifically for use with the combination. The combined system may extend the non-relational database by storing at least some data within the relational database and may allow both databases to be treated as a single logical database using the new tools. Some of the data in the relational database may also be stored in the non-relational database (thereby providing quick access to the data) and/or some of the data in the relational database may be different from data stored in the non-relational database (e.g., may include additional data fields not present in the non-relational database).

According to some embodiments, a synchronization process may be performed on data stored in both the relational and non-relational databases. For instance, modification of data stored in the logical database may be detected as having occurred in one or the other of the databases, or both, which may cause initiation of a synchronization process that copies the modified data from the database where it was modified to the other database. Accordingly, the two databases may retain synchronized copies of data that is stored in both databases. In some cases, a conflict may arise between the two databases due, for example, to edits of the same data in both databases being performed before a synchronization process can occur. In such cases, conflicts may be resolved by preselecting one of the databases as the source of true or correct data, and then copying data to ensure that database's data is synchronized to the other database. A synchronization process may be initiated on a schedule and/or by monitoring either or both databases for modification to the data.

According to some embodiments, the combined system may include an agent configured to enforce logical interconnections between the relational database and the non-relational database and/or to perform tasks relating to data management. Logical interconnections enforced by an agent may include, but are not limited to, dependencies between one or more data locations of the relational and/or non-relational databases; mappings that indicate duplicated data between the relational database and the non-relational database; and/or validity rules for one or more data locations of the relational and/or non-relational databases.

In some use cases, an agent may be configured to enforce dependency relationships between one or more data locations in the relational database and one or more data locations in the non-relational database. A dependency is a relationship between two data locations such that, to maintain data consistency of the databases, it may be necessary to modify data in one data location when data in the other data location changes. For example, a data location in the combined system may record the number of children a patient has whilst another set of data locations in the combined system may record information on the patient's children, such as names and ages. If the patient has an additional child, the child's name and age may be entered into the database, yet to maintain consistency of data, the data location that indicates the number of children the patient has must be updated as well (i.e., increased by one).

In some use cases, an operation performed from one database system (e.g., a system hosting either the non-relational database or the relational database) may be translated into one or more operations to be performed on the other database system. For example, a modification of data stored within the non-relational database made using tools of the relational database system may cause an agent to identify data in the non-relational database that should be modified and to modify the identified data. As another example, when data stored in the non-relational database is modified and that data is also stored in the relational database, the agent may determine which data in the relational database should be updated in a synchronization process, and to perform such a process.

Following below are more detailed descriptions of various concepts related to, and embodiments of, systems and methods of uniting a relational database and a non-relational database. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

FIG. 1A is a block diagram of an illustrative system that unites a non-relational database and a relational database, according to some embodiments. In the example of FIG. 1, system 100 includes system 110 and system 120 which comprise relational database 112 and non-relational database 122, respectively.

In the example of FIG. 1A, the combination of the relational database 112 and non-relational database 122 may be treated by a user of system 110 as a single logical database 130 by using tools provided by Relational Database Management System (RDBMS) 114 and managed by agent 116. That is, from the perspective of the user of system 100, there is only a single database 130 and it is largely transparent to the user that they are, in fact, accessing two different databases that utilize different underlying database technologies. This transparency is produced by the actions of agent 116, which performs operations on behalf of the user of system 100 that may, depending on the operation, involve relational database 112, non-relational database 122, or both databases. Agent 116 ensures that logical interconnections between the two databases are enforced, e.g., so that data remains consistent across the databases and operations performed on behalf of the user are executed properly.

Elements of FIG. 1A that may interact with one another (e.g., send and/or receive messages to/from) are identified in FIG. 1A by dashed lines between the elements. For example, agent 116 may access data dictionary 117 and may communicate with user interface(s) 118, RDBMS 114 and non-relational database 122.

Non-relational database 122 may be separately accessed using its native interface 124, which only has access to data stored in non-relational database 122. A user of system 120 may therefore have a user experience that matches that of a traditional user of the non-relational database. As discussed above, techniques described herein allow some users (users of system 110 in the example of FIG. 1A) to transparently access a combined system, whereas some users (users of system 120 in the example of FIG. 1A) may access only a non-relational database system (e.g., database 122 via interface 124). For example, system 120 may be a legacy health records system like VistA and system 110 may be a newly developed system that allows users improved access to the health records system whilst providing additional functionality as well.

In the example of FIG. 1A, system 110 may be any suitable computing device (or cluster of computing devices) able to provide relational database 112, RDBMS 114 and agent 116, and to present one or more user interfaces 118 to any user capable of connecting to, and authorized to utilize, the system 110. Systems 110 and 120 are configured to communicate with each other via any suitable means (e.g., via the Internet). Agent 116 is configured to access a data dictionary 117, which stores information regarding actions that the agent should perform to maintain data integrity between the two databases and/or to perform certain actions when certain triggers occur. Some examples of information that can be stored by a data dictionary are discussed in further detail below. Data dictionary 117 may include any number of data files written in any suitable format(s), including but not limited to, eXtensible Markup Language (XML), JavaScript Object Notation (JSON), Comma Separated Values (CSV), etc. or any combination thereof.

As discussed above, relational database 112 may store some data that is also stored in non-relational database 122, although either or both databases may also store data that is not stored in the other database. That is, the same conceptual data values, such as a medical patient's last name, the patient's phone number, a hospital's address, etc. may be stored in different data locations within each of the two databases 110 and 120, yet system 110 may treat such data locations as a single data location in the logical database 130 by synchronizing their values across the two databases 110 and 120. According to some embodiments, relational database 112 may include one or more tables whose records include one or more fields whose values are stored both in the relational database 112 and in the non-relational database 122. Other data fields within these records may be stored only in the relational database 112.

Agent 116 and data dictionary 117 may together define a schema that, according to some embodiments, provides an abstract description of any number of relevant entities, each entity of which may include one or more properties. For example, a patient entity may include a plurality of demographic properties, medical conditions, etc. A schedule or appointment entity may include properties such as the date of the appointment, beginning and end times for the appointment, patient information, attending physician, etc. Agent 116 may be responsible for performing operations on the entities, querying information about the entities, performing actions in connection with the entities, making sure data is consistent for the entities, both respect to self-consistency within each database and data consistency between the relational database 112 and non-relational database 122 and/or perform any other actions in connection with user queries to the databases. The data dictionary 117 may include information regarding how data stored for the various entities map between the two databases.

In some use cases, mappings between the data values stored in the relational database and corresponding values stored in the non-relational database may be stored within data dictionary 117 and enforced by agent 116. A mapping identifies two or more data locations (which may each be in relational database 112, may each be in non-relational database 122, or may be located both in relational database 112 and non-relational database 122) whose values are to be maintained as identical. Agent 116 may be configured to enforce such a mapping by monitoring when data in each of the databases 112 and 122 changes, and by writing new values of such data to corresponding mapped locations.

Figure 1B:
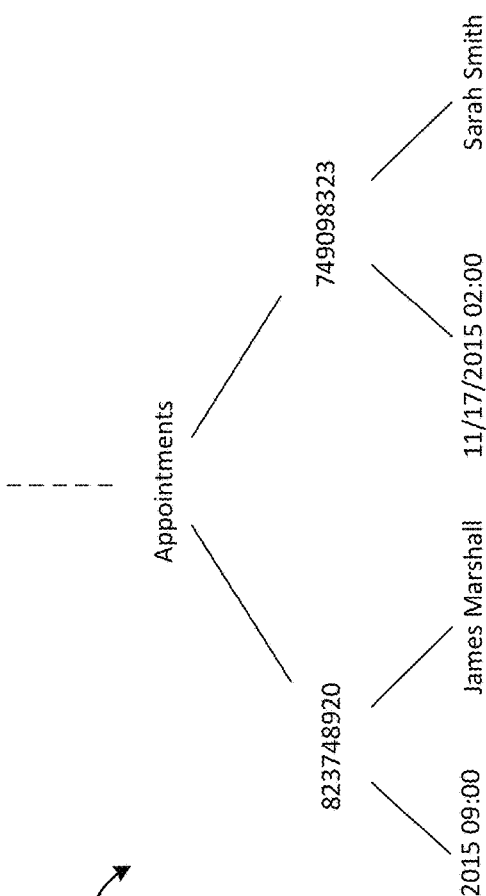
FIG. 1B illustrates an example data configuration within the system of FIG. 1A, according to some embodiments.

As a non-limiting example of a mapping, non-relational database 122 may store data relating to medical appointments but might not store a phone number of the patient along with the appointment data. Relational database 112 may include an appointments table that includes data fields corresponding to the appointments data stored in non-relational database 122 but also includes a phone number data field. Accordingly, a user accessing the relational database 112 may be able to view and/or edit an appointment record that includes all of these data fields. Edits made to fields of the appointment record other than the phone number field (e.g., via RDBMS 114 and/or user interface(s) 118) may be propagated to corresponding data locations within the non-relational database to maintain synchronized copies of the data between the two databases. Similarly, if a user edits the appointment by accessing the non-relational database 122 using its interface 124, those edits may be propagated to the relational database 112. This example configuration is depicted in FIG. 1B, which depicts a portion of data 140 that is stored in relational database 112 (as a portion of a table) and a portion of data 145 that is stored in relational database 122 (as a portion of a tree structure).

In system 100, when data is propagated from one database to another, a location of data in the target database to modify may be determined by agent 116, which may access data dictionary 117 to determine which data location(s) in the target database correspond to the modified data location(s) in the other database. In the example of FIG. 1B, edits made to the phone number data field may be stored only within the relational database. The net result is that a user of system 110 may access an extended record (e.g., the "extended" appointment records 140 that include a phone number in the example of FIG. 1B) yet it is transparent to the user that some data values are stored in the non-relational database and some are not. Other users may simultaneously access data in the non-relational database and have access to data values of the non-extended record (e.g., the record 145 that does not include the phone number in the example of FIG. 1B), which will contain the same values as corresponding data locations in the relational database due to the synchronization process being performed.

As used herein, a "data location" in relational database 112 or non-relational database 122 refers to a location in a database in which data may be stored. Typically, a relational database include numerous tables and data fields within those tables organized into rows and columns, into which data may be written. As such, a data field within a relational database is considered herein to be a "data location." Non-relational databases stored data differently from relational databases, however (e.g., in a tree structure as discussed above). A data value that is stored at a particular position (e.g., at a node) in a hierarchical non-relational database structure is also considered herein to be stored at a "data location." The term "data location," as used herein, is intended to encompass locations in either database in which data can be stored so that data can be referred to using a singular term irrespective of which database the data happens to be stored within.

According to some embodiments, and as mentioned above, agent 116 may monitor relational database 112 for modifications to its data, such as by making periodic checks of the data stored in the database, receiving an indication from database 112 of when data changes occur and/or by configuring the database 112 to provide an indication of when data changes occur. When it is determined that one or more data values of the database 112 have been changed, one or more processes such as those described below in relation to FIGS. 3A-3E may be triggered. For example, in some cases, modified data that is also stored in the non-relational database 122 may be copied to that database.

According to some embodiments, agent 116 may monitor non-relational database 122 for modifications to its data, such as by making periodic checks of the data stored in the database, receiving an indication from database 122 of when data changes occur and/or configuring the database 122 to provide an indication of when data changes occur. When it is determined that one or more data values of the database 122 have been changed, one or more processes such as those described below in relation to FIGS. 3A-3E may be triggered. For example, in some cases modified data that is also stored in the relational database 112 may be copied to that database.

According to some embodiments, agent 116 may be initialized when system 110 is initialized or at any other suitable time. Data dictionary 117, which agent 116 accesses to perform the various actions described herein, may be automatically generated, in whole or in part, and/or may be manually created, in whole or in part. For instance, data stored in data locations of the non-relational database 122 may be identified by reading a data dictionary, schema, etc. of the non-relational database and by populating portions of data dictionary 117 from that data. Additionally, or alternatively, aspects of the data dictionary 117 may be manually created and/or updated by an administrator of system 110 who determines which data locations of the relational database 112 conceptually correspond to which data locations of non-relational database 122.

In the example of FIG. 1A, agent 116 is configured to communicate with the non-relational database 122. The agent may be configured to access one or more interfaces (e.g., Application Programming Interfaces (APIs)) of the database, which may include interfaces native to the non-relational database and/or additional interfaces written and configured to interact with the database. The agent 116 may thereby perform actions within the non-relational database, including but not limited to reading, writing and/or modification of data, altering of access permissions, etc.

According to some embodiments, the agent 116 may be configured to respect access permissions defined in the non-relational database 122 within the context of the relational database 112. In some use cases, the agent 116 may determine one or more access permissions of a user of the system 100 when that user accesses the non-relational database and provide the same access permissions to that user when the user accesses the relational database 112. For example, the agent may determine that a user does not have permission to modify patient records in the non-relational database, and enforce the same restrictions to that user with respect to patient record data stored in the relational database.

According to some embodiments, the agent 116 may be configured to produce an audit log of its actions. While techniques are described herein to avoid data integrity problems such as conflicts, it may nonetheless be beneficial to maintain a list of actions that the agent 116 has performed to the non-relational database 122. In some use cases, such a log may also be necessary to comply with certain regulations that apply to the database systems (e.g., to comply with the Health Insurance Portability and Accountability Act (HIPAA)).

According to some embodiments, the same authentication information may be used by a user to access both relational database 112 and non-relational database 112. Such an approach may simplify user management of the combined database system.

According to some embodiments, user interface(s) 118 may include any number of user interfaces for users to perform actions within relational database 112 and/or non-relational database 122. Illustrative user interfaces may include, but are not limited to, a browser interface that allows interaction with the logical database 130, search dialogs and/or search forms, data table contents, data view contents, prompts for conflict resolution between the databases, or combinations thereof. In some embodiments, agent 116 may initiate user interface changes in the user interface(s) 118 as a result of a condition defined by data dictionary 117 being met. For example, when the agent identifies is a data conflict between two data locations in the logical database 130, it may produce a request for corrective action in the user interface(s) 118.

Figure 1C:
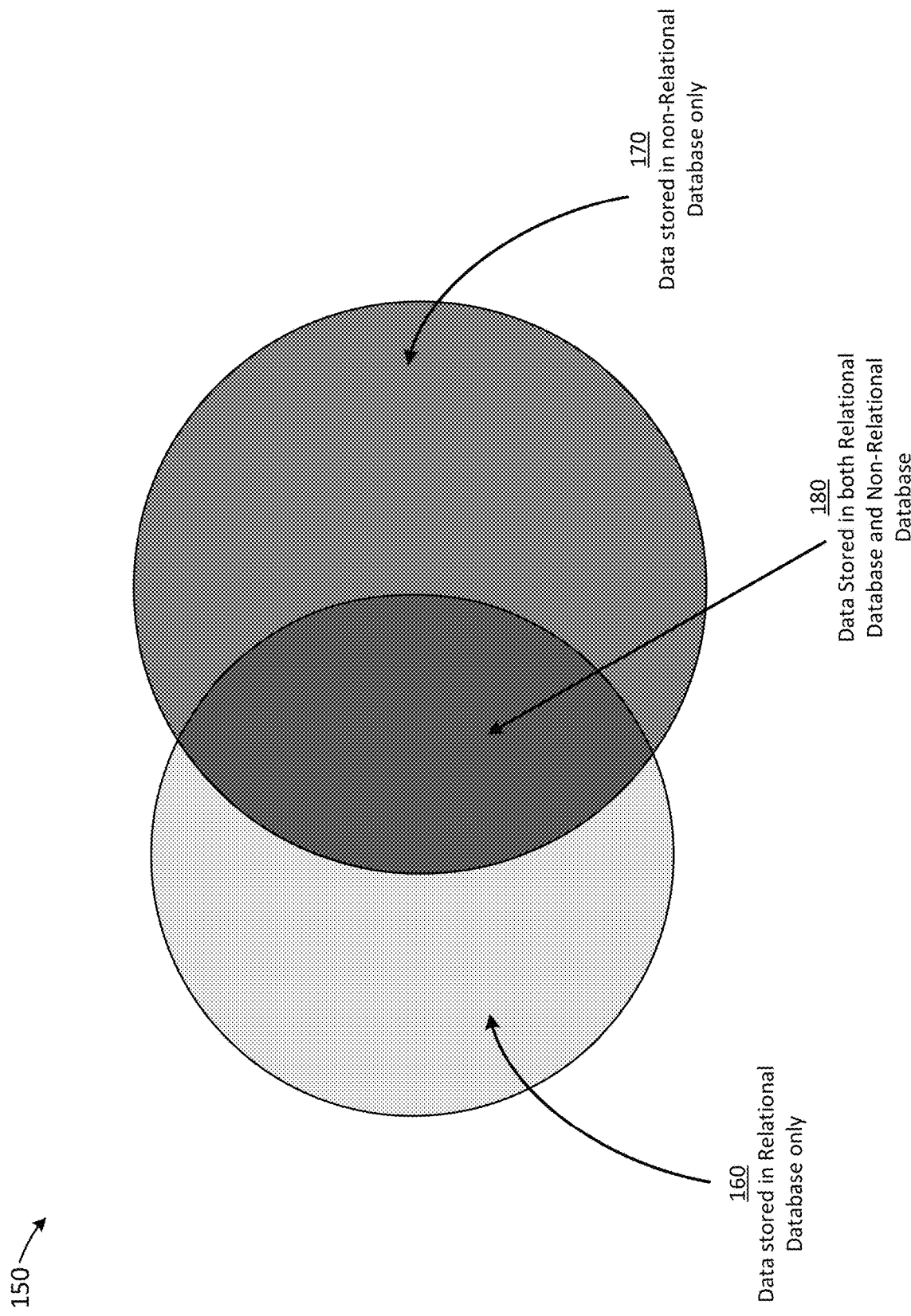
FIG. 1C depicts a Venn diagram of data values that are stored in either, or both, of the relational database and non-relational database of FIG. 1A, according to some embodiments.

For the purposes of illustration, FIG. 1C depicts a Venn diagram of data values that are stored in either, or both, of the relational database 112 and non-relational database 122. It will be appreciated that, in general, any portion of the data within the two databases may be represented by each data segment 160, 170, 180. In some use cases, one or more of data segments 160, 170 or 180 may contain no data. For instance, in some use cases, there may be no data this is stored only in the relational database 112 and all the data is either stored only in the non-relational database 122 or in both the relational database 112 and the non-relational database 122 (in which case data segment 160 includes no data).

In the example of FIGS. 1A-1C, there are several use cases for data modification that depend on both where the data being modified is located (i.e., in which segment 160, 170 or 180) and how the data is being modified (i.e., by accessing RDBMS 114 or by accessing the interface 124). It is illustrative to describe each of these use cases, as follows.

A user accessing the non-relational database interface 124 only has access to data in data segments 170 and 180, as data 160 stored only in the relational database cannot be accessed by the non-relational database system. A user accessing the non-relational database interface 124 and modifying data in data segment 170 may perform actions that are native to the non-relational database system. A user accessing the non-relational database interface 124 and modifying data in data segment 180 may perform actions native to the non-relational database system. However, in this case modifications of data may result in a subsequent synchronization process that copies those modifications to corresponding data locations of the relational database 112, as described further below.

A user accessing RDBMS 114 and modifying data in data segment 160 may perform actions that are native to the relational database system. A user accessing RDBMS 114 and modifying data in data segment 170 requires that the relational database system 110 identify the data locations of the non-relational database and execute commands to perform modification of the data in those locations. This process is described in further detail below in relation to FIG. 2. A user accessing RDBMS 114 and modifying data in data segment 180 also may perform actions native to the relational database system. However, in this case modifications of data may result in a subsequent synchronization process that copies those modifications to corresponding data locations of the non-relational database 122. This synchronization process may also utilize the process described below in relation to FIG. 2, although is described more completely in relation to FIGS. 3A-3B.

In some use cases, a single operation by a user using either RDBMS 114 or non-relational database interface 124 may result in modifications to multiple data values in different data locations. In such a scenario, the use cases described above may be applied to each of the data modifications. For example, if a user accessing RDBMS 114 modifies a record by editing a data field stored in only the relational database (segment 160) and also edits a data field in that record that is stored in both the relational database and the non-relational database (segment 180), this may result in an update native to the relational database system (to update both values in that database) in addition to a subsequent synchronization process (to propagate the latter edit to the non-relational database).

Figure 2:
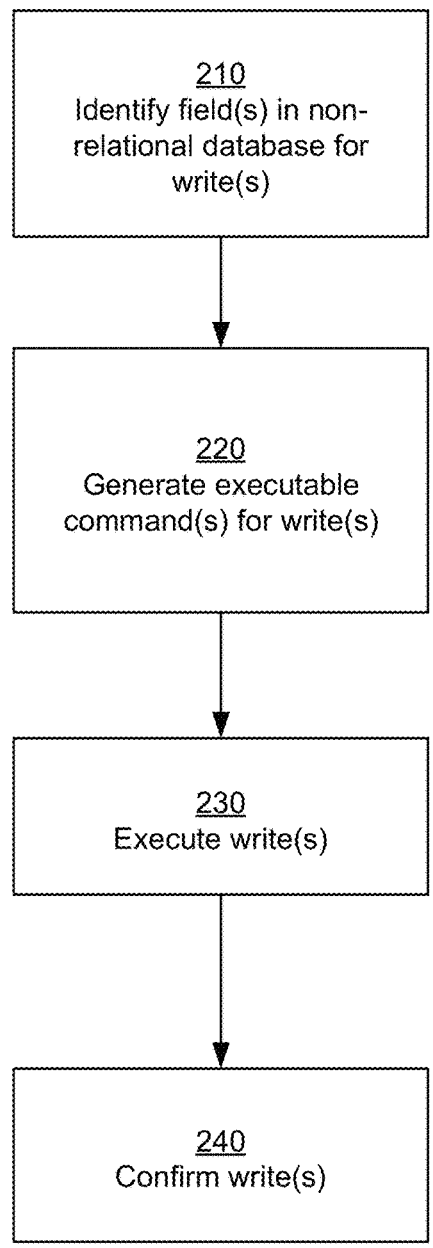
FIG. 2 is a flowchart depicting an illustrative example of modifying data of a non-relational database, according to some embodiments.

FIG. 2 is a flowchart depicting an illustrative example of modifying data of a non-relational database, according to some embodiments. The example process of FIG. 2 may be performed by a system to modify data in a non-relational database. For example, method 200 may be performed by agent 116 to modify data stored in the non-relational database 122. According to some embodiments, agent 116 modifies data and/or performs one or more other operations in response to a user providing input via a browser interface (e.g., one of user interface(s) 118). For example, a user may schedule an appointment, cancel and appointment, modify an existing appointment, etc., which in turn triggers modification to one or both databases. A modification of data stored by a non-relational database may, for instance, be due to a write command being issued to the non-relational database from another system and/or due to a synchronization process being initiated from another system including a relational database.

Method 200 begins in act 210 in which one or more fields of the non-relational database to be written to are identified. According to some embodiments, this determination may be made by an agent that determines, for a selected data field, which data fields of the non-relational database correspond to that selected data field. Such a determination may be made using information from a data dictionary or other suitable data source. For example, a user accessing a user interface (e.g., user interface 118) may see a data field labeled "Patient Name" and may edit a data value for a record within that field. The data within the presented field may, in some cases, only be stored at data locations within the non-relational database. In such cases, a modification of the presented "Patient Name" field may cause a determination of which data location(s) in the non-relational database correspond to the presented field, by accessing a data dictionary, lookup file, and/or otherwise.

In act 220, one or more executable commands are generated to perform the requested modification of the identified data field(s). These commands may be generated with knowledge of the native command language of the non-relational database and may be generated based on the data values as modified and/or based on one or more properties of the identified data field(s). In some embodiments, an agent may be configured to generate such commands based on information provided by a data dictionary. The generated commands are executed in act 230. In act 240, the modification of the data field(s) performed in act 230 is confirmed, such as by performing a read operation on the data field(s).

Optionally, a subsequent step may be performed to examine whether the non-relational database performed any alterations of the written data. In some cases, a write to the non-relational database may be successful but the non-relational database may alter the written value subsequent to the write due to, for example, internal consistency rules or other internal rules. For example, the non-relational database may have a rule that the only appointment times that are permitted begin on the hour. A write to the non-relational database of a time "08:57" may successfully performed, yet the non-relational database may subsequently alter this value, such as by rounding the value to "09:00" in order to meet the internal rule. In cases in which the appointment time is stored in both the non-relational database and a relational database (and may therefore have been updated in the non-relational database as a result of a synchronization process), an update to a corresponding appointment time value stored in the relational database may subsequently be made (e.g., writing the corrected "09:00" time to the relational database) so that the corresponding data fields in each database have the same value.

As discussed above, a system for combining relational and non-relational databases may include an agent configured to perform various actions to maintain the integrity of data in the combined logical database and/or to perform additional actions relating to data operations. FIGS. 3A-3E illustrate a process of performing one or more such actions in response to detection of an altered data value.

Figure 3A:
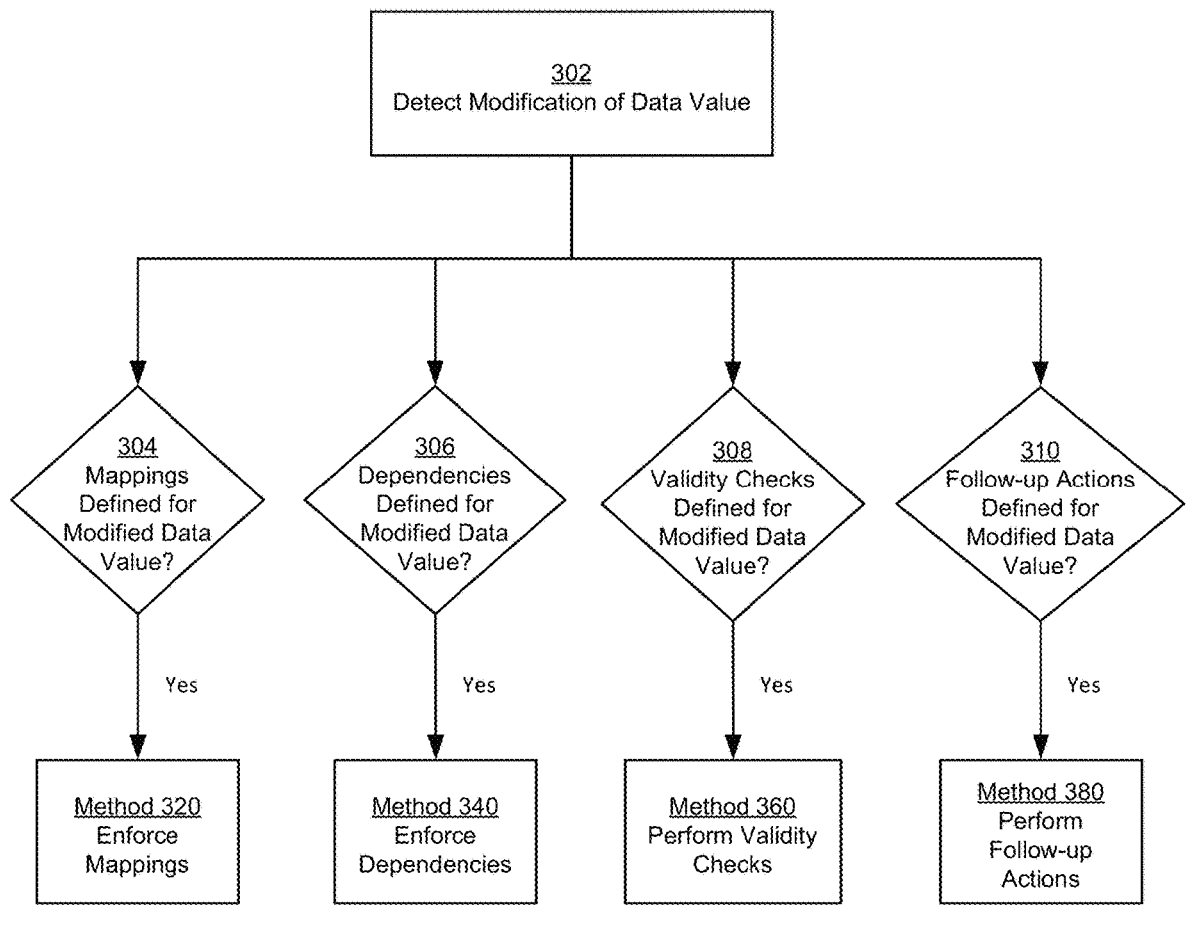
FIGS. 3A-3E illustrate a process of performing one or more such actions in response to detection of an altered data value, according to some embodiments.

FIG. 3A illustrates method 300, in which modification of a data value is detected and in which one or more actions are performed as a result. These actions are depicted in FIGS. 3B-3E as shown in FIG. 3A. Method 300 may be performed by an agent or other hardware and/or software process, such as agent 116 shown in FIG. 1A, and may be performed within the context of any system that operates a relational database and non-relational database as a single logical database.

In act 302, modification of a data value is detected. Detection may be accomplished in various ways, including by an agent repeatedly examining one or more data locations to determine whether data in a location has changed, and/or by receiving any number of messages sent from the non-relational database to the relational database and/or internal messages sent within the relational database system. Such messages may, for example, include an identification of which data fields were modified, in which database, when the modification occurred, or combinations thereof.

In some embodiments, an agent may detect a data modification in a sequence of operations. For example, an agent may quickly identify whether a collection of data (e.g., a table of the relational database) has been changed (e.g., by running a checksum on the collection of data, by examining a timestamp indicating a time of the last modification, etc.). If the identification indicates data has changed, a further operation may be performed on a subset of the collection of data to narrow down which data value(s) have been modified.

Irrespective of how modification of a data value is detected, whether there are mappings defined that include the modified data value is determined in act 304. As discussed above, a mapping identifies two or more data locations whose values are to be maintained as identical. If one or more of those mappings includes the data value detected to have been modified, an action to enforce the defined mapping is performed in method 320. Such an action may comprise propagating that modification to the other data locations to which the modified data value is mapped. According to some embodiments, mappings may be defined by a data dictionary and an agent may determine whether one or more actions to enforce mappings should be initiated based on the data dictionary and an indication of which data value has been modified.

In act 306, whether there are dependencies defined that include the modified data value is determined. As discussed above, a dependency is a relationship between two data locations such that, to maintain data consistency of the databases, it may be necessary to modify data in one data location when data in the other data location changes. If one or more of those dependencies includes the data value detected to have been modified, an action to enforce the defined dependency is performed in method 340. Such an action may comprise determining whether to modify one or more dependent data locations and if so, to modify data in those locations. According to some embodiments, dependencies may be defined by a data dictionary and an agent may determine whether one or more actions to enforce dependencies should be initiated based on the data dictionary and an indication of which data value has been modified.

In act 308, whether there are validity checks defined that include the modified data value is determined. Data locations in either a relational database or a non-relational database may have validity rules associated with them. Such rules may include formatting rules (e.g., a date format of "MM/DD/YYYY"), value bounds (e.g., an patient age must be less than 200), character-based restrictions (e.g., a zip code must be numerical only), etc. If one or more of the defined validity rules includes the data value detected to have been modified, an action to enforce the defined validity rule(s) is performed in method 360. According to some embodiments, validity rules may be defined by a data dictionary and an agent may determine whether one or more actions to enforce validity rules should be initiated based on the data dictionary and an indication of which data value has been modified.

In act 310, whether there are follow-up actions defined that include the modified data value is determined. Data locations in either a relational database or a non-relational database may have follow-up actions associated with them. A follow-up action includes any action other than further examination and/or modification of data. In some use cases, a follow-up action may be conceptually related to the nature of the modification of the data value in act 302, and may for example, include producing output via a user interface, sending an email, interacting with an external system, etc. For example, in a medical records system, modification of a data value that indicates a patient appointment has been canceled may generate a follow-up action of sending the patient an email to confirm the cancellation. In this manner, the nature of the data modification produces a particular, related action that is something other than further examination and/or modification of data. If one or more of the defined follow-up actions includes the data value detected to have been modified, method to perform the follow-up action(s) in method 380. According to some embodiments, follow-up actions may be defined by a data dictionary and an agent may determine whether one or more follow-up actions should be initiated based on the data dictionary and an indication of which data value has been modified.

In method 300, any number of different operations represented by methods 320, 340, 360 and 380 may be performed, any number of times. Where multiple instances of methods 320, 340, 360 and/or 380 are performed within method 300, such instances may be performed in parallel, in serial, or as a combination of both. For example, when a data value detected to have been modified in act 302 has multiple mappings defined and a follow-up action defined, method 320 to enforce the mappings may be executed once for each mapping in serial fashion whilst the follow-up action is simultaneously performed in parallel. Any suitable ordering of such methods may be performed in general, however.

Figure 3B:
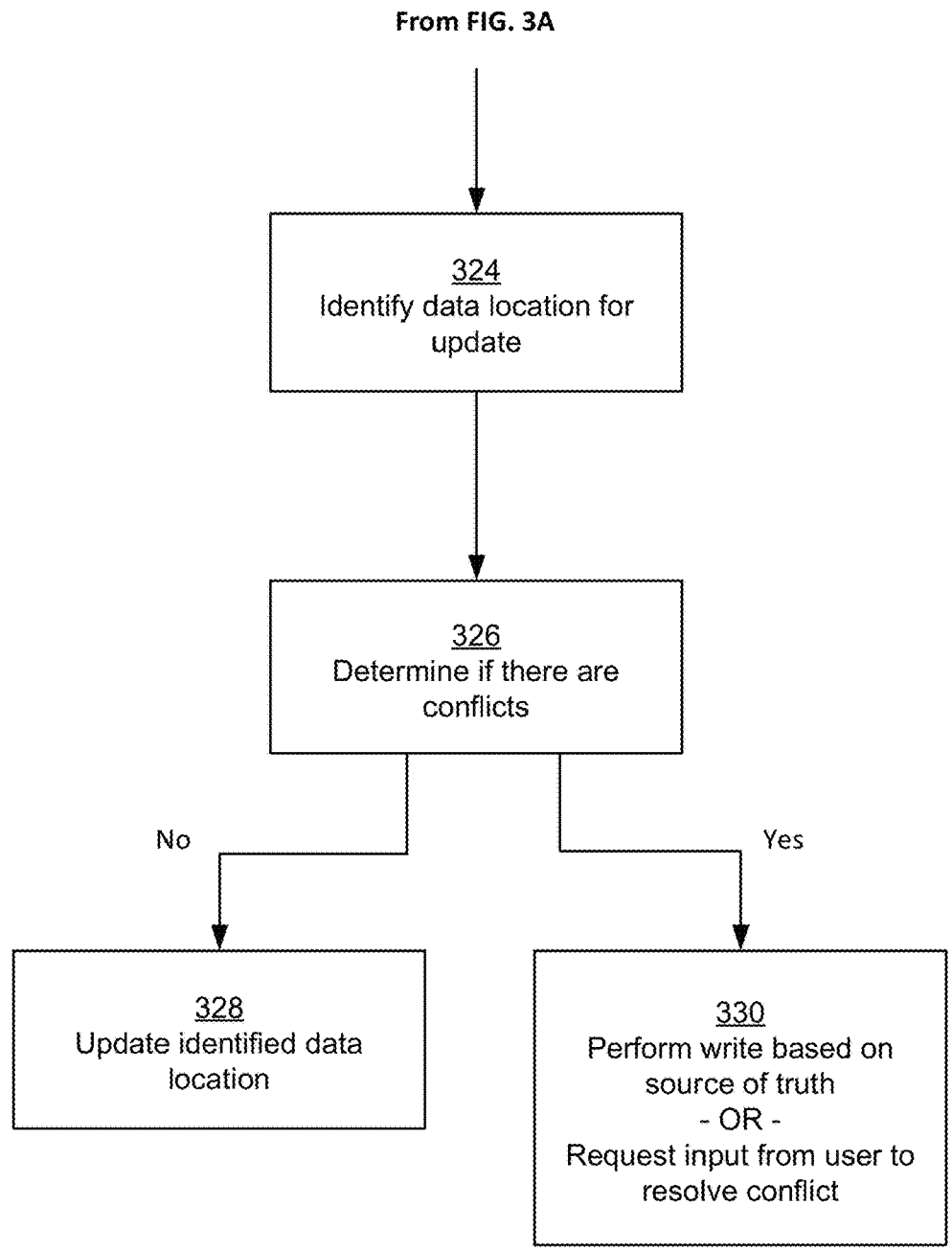

FIG. 3B is a flowchart depicting an illustrative example of performing a mapping process, according to some embodiments. In act 324, a data location (e.g., a data field) is identified from a defined mapping of the data value whose modification was detected in act 302. In act 326, the system determines whether mapping the modified data in one database to a corresponding field in the other database will result in a conflict. Conflicts can occur, for example, when data is modified in one database and before the modification can be propagated to the other database, the corresponding (mapped) data value in the other database is modified. Accordingly, in some embodiments, determining whether a conflict has occurred in act 326 may comprise examining the time of modification of the data value in each database and comparing these to the present time.

If it is determined that there is no conflict in act 326, the identified data location is updated in act 328 by writing the data value in the modified data field in the first database, into the other database. For instance, if the non-relational database has a data value whose modification is detected in act 302 and that results in the mapping process of method 320, the modified data value may be written to a corresponding data location in the relational database.

If it is determined that there is a conflict in act 326, in act 330 either a write is performed based on which database is considered to be the source of truth, or input is requested from a user to decide which of the two conflicting values should be kept in both databases as the correct one. Either the relational database or the non-relational database may be considered to be the source of correct data (or "truth"), and this selection may be stored for instance in a data dictionary, may be reflected in the configuration of an agent, and/or otherwise. If the database whose modification resulted in the mapping process is the source of truth, the identified data locations will be updated in act 330 just as in act 328. However, if the database whose modification resulted in the mapping process is not the source of truth, the modified data values are instead written to be identical to the values currently stored in the other database. In either case, the conflict is resolved in favor of the value stored in the database considered to be the source of truth.

Alternatively in act 330, a user may be prompted to decide which value to keep, in effect selecting for this case only, which value is the "true" value. According to some embodiments, whether input is requested from a user or whether a database is selected automatically as the source of truth in act 330 may depend on one or more of: which data field was modified, in which database the modification was made, and security settings (e.g., access privilege) associated with a user who made the modification. According to some embodiments, an agent executing method 320 may send an instruction to a user interface to produce the user prompt.

Figure 3C:
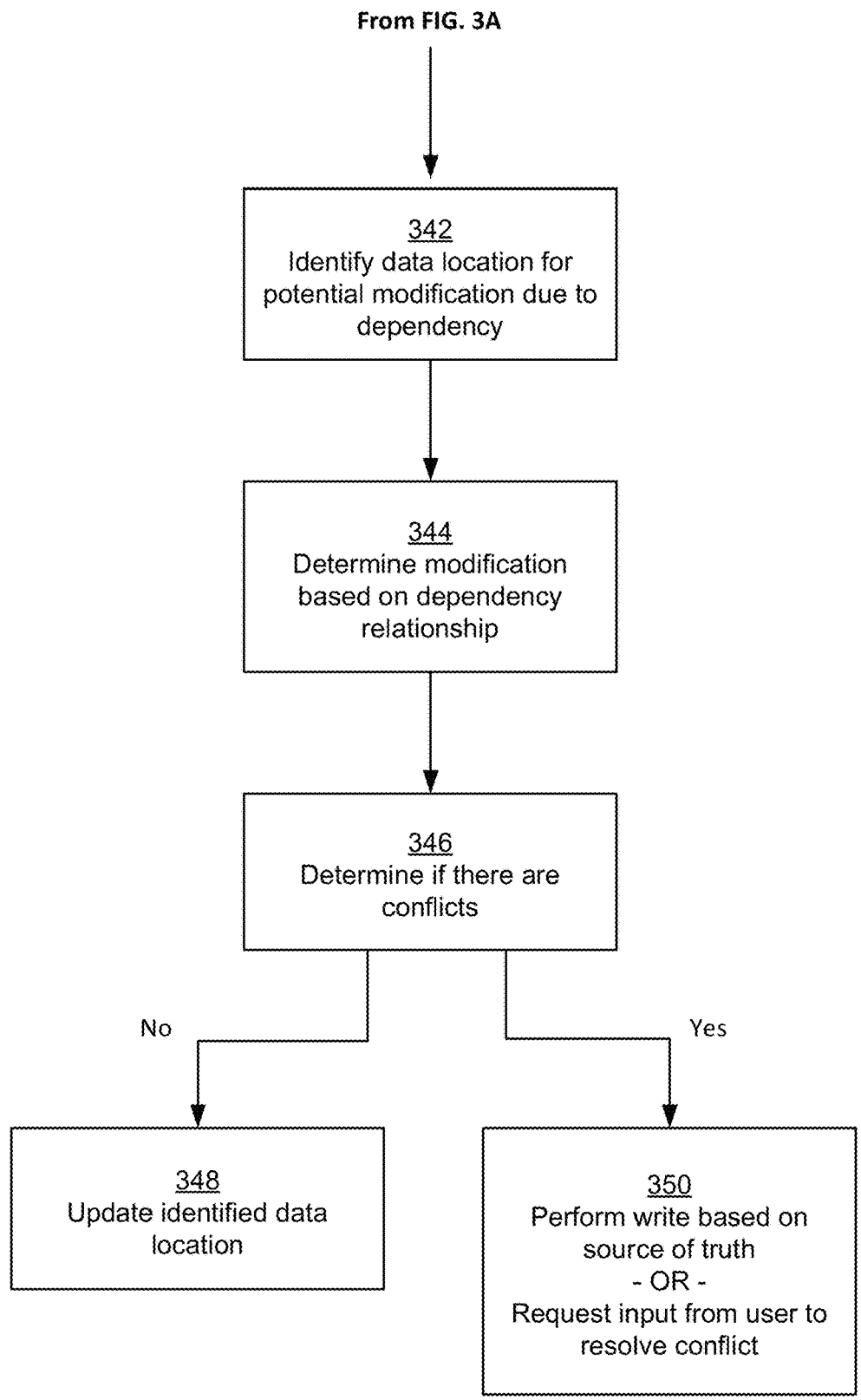

FIG. 3C is a flowchart depicting an illustrative example of enforcing data dependencies, according to some embodiments. In act 342, a data location is identified for potential modification due to a defined dependency. As discussed above, such dependencies may be defined in a suitable data dictionary.

In act 344, whether to perform modification of the data location identified in act 342 is determined. In some use cases, a definition of the dependency may include one or more rules that prescribe the cases in which dependent data should be modified, and may also indicate how the data should be modified in such cases. A dependency is different from a mapping in that a mapping maintains identical copies of data values, whereas a dependency ensures that certain relationships are maintained between data values. These relationships may be defined in any suitable way.

For example, one data value might store a patient's weight in kilograms whereas a different data value might store the patient's weight in pounds. A dependency rule may be defined that indicates a mathematical relationship between these two data values (e.g., data value 1=(data value 2)×2.2). When either value is modified, a subsequent modification of the other data value may be performed whilst respecting the dependency. In this example, it is not necessary to determine whether the modification should be performed in act 344, but rather what a result of the modification should be.

As another example, one data value might store the date and time of a patient appointment and another data value might store a value indicating whether the appointment is in the morning or the afternoon. A dependency rule might be defined that indicates the value of the latter data value (e.g., "AM" or "PM") should be based upon an analysis of the value of the former data value (e.g., whether value is between "00:00" and "11:59" or between "12:00" and "23:59"). When the time data value is modified, in act 344 it may be determined first whether a modification to the value will be performed or not. If it is determined that the morning/afternoon value will be modified, the modification can then be performed. While it may be the case that the modification can always be performed without negative effects upon the data, it may be more efficient and/or may reduce processing overhead of the target database to only make a modification to data based on a dependency when the data is to be to be changed to a different value.

In act 346, the system determines whether applying the dependency rule will result in a conflict. If it is determined that there is no conflict in act 346, the identified data location is modified in act 348 by writing a result of the dependency rule into the defined data location. If it is determined that there is a conflict in act 346, in act 350 either a write is performed based on which database is considered to be the source of truth, or input is requested from a user to decide which of the two conflicting values should be kept in both databases as the correct one. If the database whose modification resulted in the mapping process is the source of truth, the identified data locations will be updated in act 350 just as in act 348. However, if the database whose modification resulted in the mapping process is not the source of truth, the modified data values are instead written to be identical to the values currently stored in the other database. In either case, the conflict is resolved in favor of the value stored in the database considered to be the source of truth.

Alternatively in act 350, a user may be prompted to indicate a correct value, in effect selecting for this case only, which value is the "true" value. According to some embodiments, whether input is requested from a user or whether a database is selected automatically as the source of truth in act 350 may depend on one or more of: which data field was modified, in which database the modification was made, and security settings (e.g., access privilege) associated with a user who made the modification. According to some embodiments, an agent executing method 340 may send an instruction to a user interface to produce the user prompt.

Figure 3D:
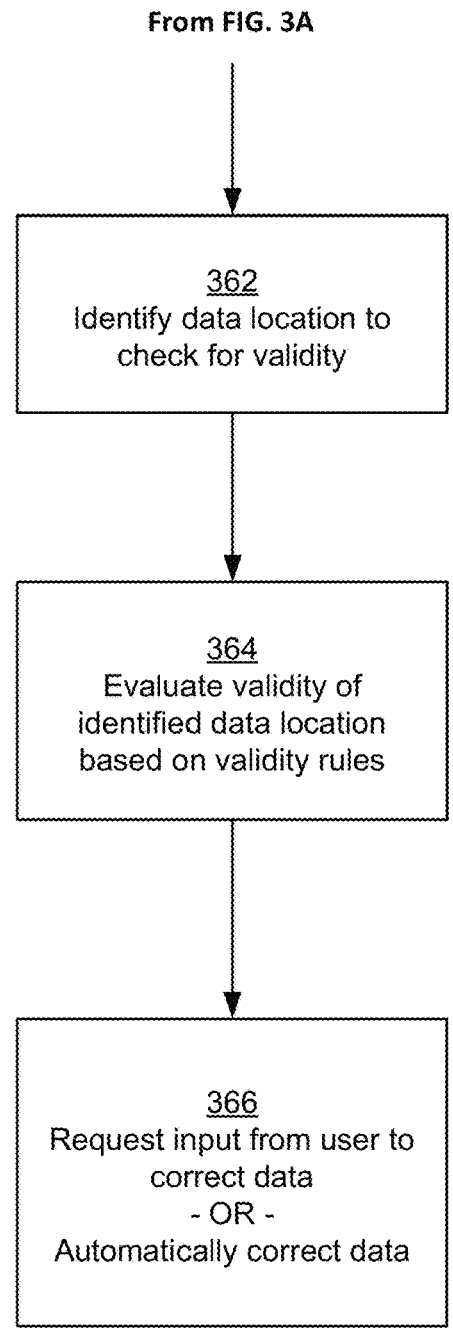

FIG. 3D is a flowchart depicting an illustrative example of enforcing data validity, according to some embodiments. In act 362, a data location is identified for potential modification due to a defined validity rule. As discussed above, such validity rules may be defined in a suitable data dictionary. In some use cases, the data location being examined for validity may be the location of the data value detected to have been modified in act 302. Accordingly, in such cases, identification of a data location may simply comprise identifying that the validity rule thus defined refers to that data value.

In act 364, whether to perform modification of the data location identified in act 362 is determined. In some use cases, a definition of the validity rule may include one or more rules that indicate when a data value in the identified location is, or is not, valid. In some use cases, a validity rule may also indicate whether an invalid rule should be corrected by user input and/or by automatically correcting the invalid value. In the latter case, the validity rule may also indicate how to automatically correct such a value.

As discussed above, validity rules may include such rules as formatting rules (e.g., a date format of "MM/DD/YYYY"), value bounds (e.g., an patient age must be less than 200), character-based restrictions (e.g., a zip code must be numerical only), etc.

In act 366, if it is determined in act 364 that the identified data location contains data that fails the validity rule, either input is requested from a user or the data is automatically corrected, as defined by the relevant validity rule as discussed above.

Figure 3E:
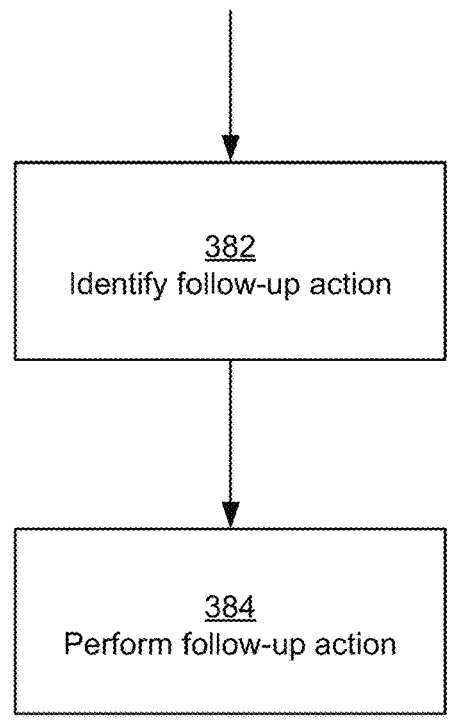

FIG. 3E is a flowchart depicting an illustrative example of performing a follow-up action, according to some embodiments. In act 382, a follow-up action is identified based on a defined follow-up action. As discussed above, such follow-up actions may be defined in a suitable data dictionary. In act 384, the identified follow-up action is performed. As discussed above, such performance may include producing output via a user interface, sending an email, interacting with an external system, etc.

Figure 4:
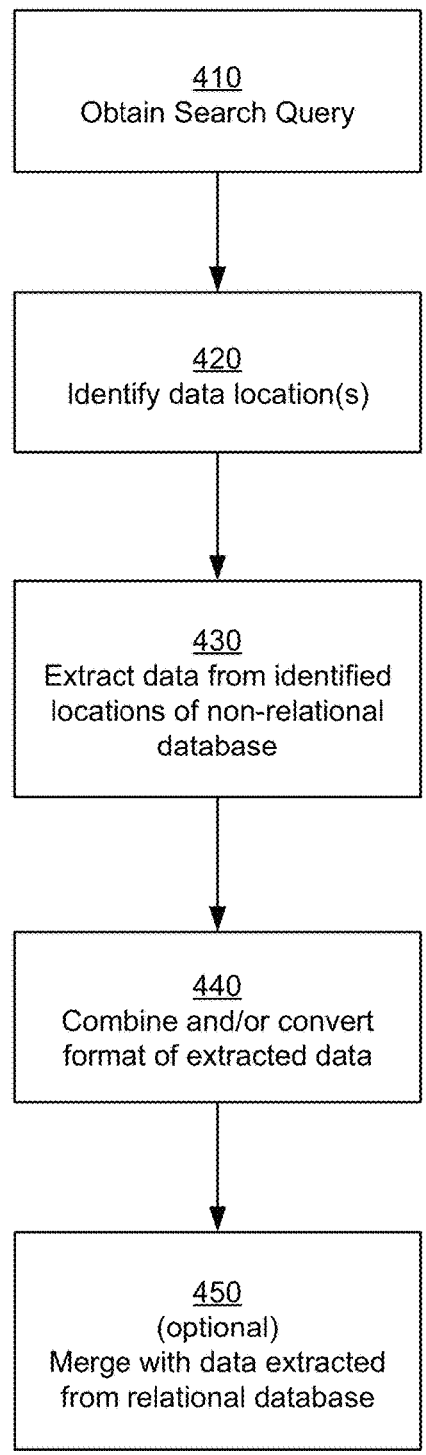
FIG. 4 is a flowchart depicting an illustrative example of performing a search query, according to some embodiments.

FIG. 4 is a flowchart depicting an illustrative example of performing a search query, according to some embodiments. The example process of FIG. 4 may be performed by a system to read data stored in a non-relational database. For instance, system 110 in the example of FIG. 1A may perform method 400 in order to read data from non-relational database 122 (e.g., agent 116 may access database 122).

Method 400 begins in act 410 in which a search query is received. The search query may be received through a number of different actions. In some embodiments, a search query may be generated due to user action(s) within a user interface. Such action(s) may take the form of an express search action, or otherwise. For example, a user browsing an appointment book in a user interface may, by selecting to view appointment for a particular day, cause the system to generate a query constructed to retrieve all appointment information for that date. As another example, however, a user may fill out one or more fields of a search form in a user interface and hit a "Search" button which may cause the system to generate of a query to find records matching the specified search criteria. A query may also be manually generated, such as by typing a SQL query statement in a suitable user interface.

Irrespective of how the search query is generated, in act 420 one or more data location(s), which may include data locations of a relational database and/or of a non-relational database, are determined based on the search query. In some use cases, an agent or lookup file may be accessed to identify one or more data locations to which the search query pertains. For instance, a query to retrieve data from all data locations associated with a particular medical patient may be requesting some data locations of a record that are stored in a relational database only and other data locations that are stored in the non-relational database. In such cases, the references in the query to data locations of the relational database may be interpreted natively by the relational database, whereas references in the query to data locations of the non-relational database may be looked up by an agent to determine where in the non-relational database the corresponding data values are stored (e.g., by the agent accessing a data dictionary). Determination of a data location may be performed for each data location that is to be returned by the search query.

In act 430, data is extracted (read) from the locations of the non-relational database identified in act 420. As an optional step, data may also be read from locations of the relational database identified in act 420.

In act 440, the data extracted from the non-relational database in act 430 is combined and/or converted into a new format. Due to the hierarchical structure of data in the non-relational database, it may be beneficial in some use cases to convert the extracted data into a new format, for instance to be presented to a user through a user interface (e.g., user interface 118). In addition to, or alternatively to, such a conversion, since data in the non-relational database is stored in a hierarchical structure, it may be necessary to combine data from multiple locations in said structure to assemble the results of the search query.

As an optional step, in act 450 data combined and/or converted in act 440 may be merged with data extracted from the relational database (in use cases in which the search query also produced data from the relational database). In some embodiments, a conversion of data in act 440 may be performed in order to convert data from the non-relational database into a form in which it can be readily merged with data natively extracted from the relational database. For instance, the conversion of data in act 440 may produce data in a self-describing format that allows nested data, such as JavaScript Object Notation (JSON) and/or eXtensible Markup Language (XML).

Figure 5:
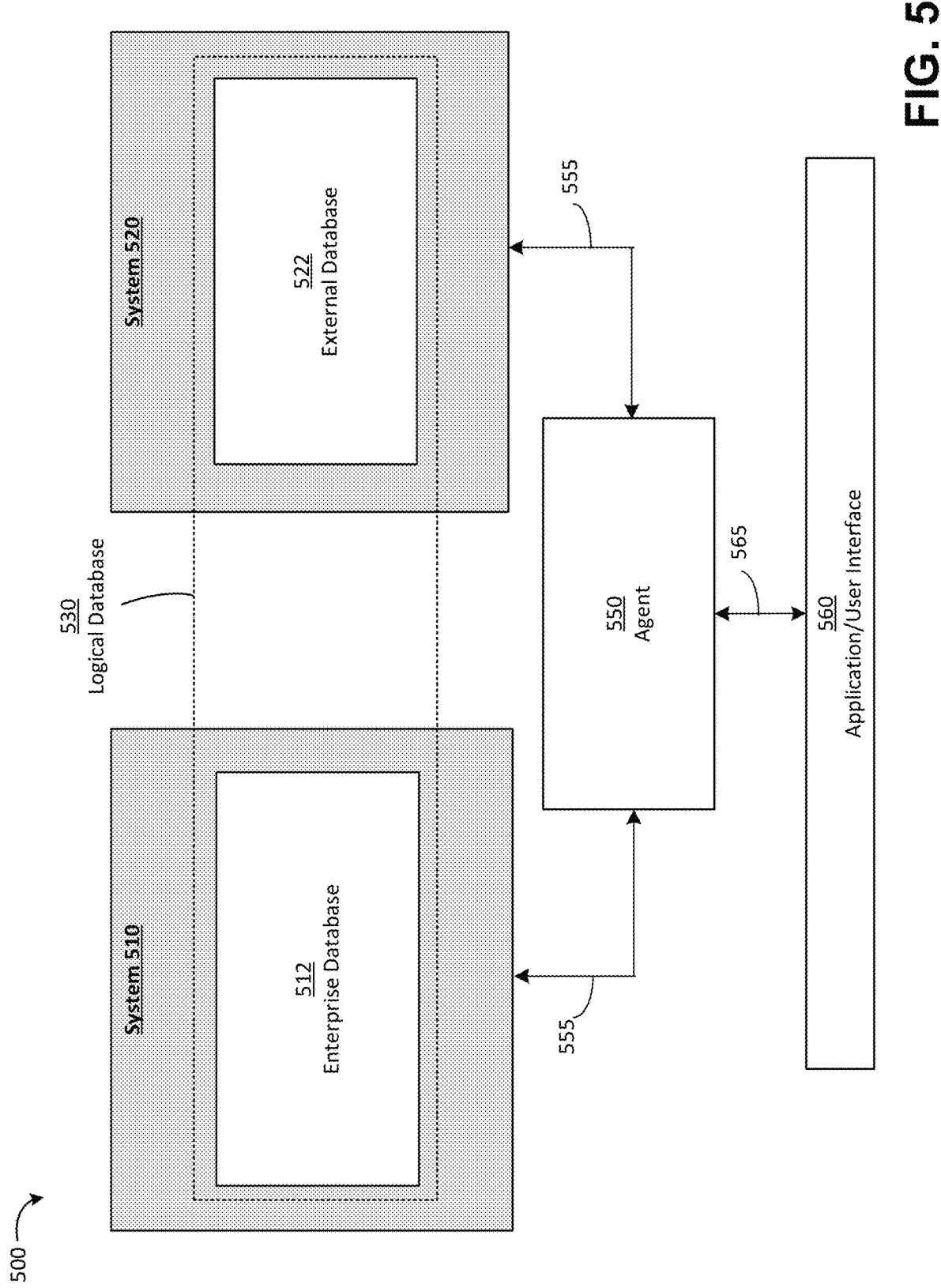
FIG. 5 illustrates a block diagram of an illustrative system that unites an enterprise database and an external database, according to some embodiments.

FIG. 5 illustrates a system 500 on which techniques described herein may be utilized to, for example, integrate a database system with a legacy database system. System 500 comprises a system 510 that includes an enterprise database 512 and a system 520 that includes an external database 522 (e.g., a legacy database system). Enterprise database 512 may be any database that provides database services to one or more applications (e.g., application 560). External database 522 may be a database, such as a legacy database, that stores information also utilized by the one or more applications. Enterprise database 512 and external database may, but need not be, of different architectures and/or paradigms. For example, enterprise database 512 may be a relational database while external database 522 may be a non-relational database.

System 500 further comprises agent 550 configured to communicate with enterprise database 512 and external database 522. In system 500, agent 550 is also coupled to one or more applications and/or user interfaces 560 that expose functionality to the user. The functionality exposed to the user through application/user interface 560 (e.g., a web application having a browser interface) may involve accessing, modifying or otherwise interacting with data stored in enterprise database 512, external database 522, or both. Agent 550 is configured to receive input from a user, e.g., commands and/or queries (referred to herein collectively as "requests") via application/user interface 560 and translate them into one or multiple operations on the enterprise and/or external databases so that, from the user perspective, the system appears as a single logical database 530. For example, requests 565 received from application/user interface 560 may be translated into one or more operations 555 on the databases to which agent 550 is coupled. A request may be translated into any number of operations on either database, or both databases. Additionally, a request may be translated into one or more actions to be performed based on, or as a result of, the one or more operations. The one or more actions need not be actions performed on the database, but may be auxiliary actions such as generating an email, updating one or more aspects of application/user interface 560, generating an alert, launching and/or communicating with another program or application, etc.

Because enterprise database 512 and external data 522 likely have different architectures, agent 550 is programmed to translate commands and requests from the user into the corresponding queries or transactions in accordance with the format, protocol and/or language of the respective database. Agent 550 may be configured to perform any of the techniques described in the foregoing, including but not limited to, mapping between the enterprise and external database, applying data dependencies, data conversion, performing side-effect or auxiliary actions, data synchronization and/or ensuring data consistency within and between the enterprise and external databases. Agent 550 may include an API that allows applications to communicate with the agent 550 without having to consider the underlying databases coupled to and utilized by the agent.

An illustrative implementation of a computer system 600 that may be used to unite relational and non-relational databases as described herein is shown in FIG. 6. The computer system 600 may include one or more processors 610 and one or more non-transitory computer-readable storage media or storage devices (e.g., memory 620 and one or more non-volatile storage media 630). The processor 610 may control writing data to and reading data from the memory 620 and the non-volatile storage device 630 in any suitable manner, as the aspects of the invention described herein are not limited in this respect. To perform the functionality and/or techniques described herein, the processor 610 may execute one or more instructions stored in one or more computer-readable storage media (e.g., the memory 620, storage media, etc.), which may serve as non-transitory computer-readable storage media storing instructions for execution by the processor 610.

In connection with techniques for uniting a relational and a non-relational database as described herein, code used to, for example, execute commands to modify and/or read data from a non-relational database (e.g., as executed by a system hosting the relational database), create and/or modify an agent, etc. may be stored on one or more computer-readable storage media of computer system 600. Processor 610 may execute any such code to provide any techniques for uniting a relational and a non-relational database as described herein. Any other software, programs or instructions described herein may also be stored and executed by computer system 600. It will be appreciated that computer code may be applied to any aspects of methods and techniques described herein. For example, computer code may be applied to automatically translate a format of data extracted from a non-relational database into a predefined data format (e.g., JSON, XML, etc.).

Various inventive concepts may be embodied as at least one non-transitory computer readable storage medium (e.g., a computer memory, one or more floppy discs, compact discs, optical discs, magnetic tapes, flash memories, circuit configurations in Field Programmable Gate Arrays or other semiconductor devices, etc.) or a computer readable storage device encoded with one or more programs that, when executed on one or more computers or other processors, implement some of the various embodiments of the present invention. The non-transitory computer-readable medium or media may be transportable, such that the program or programs stored thereon may be loaded onto any computer resource to implement various aspects of the present invention as discussed above.

The terms "program," "software," and/or "application" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of one or more embodiments described herein need not reside on a single computer or processor, but may be distributed in a modular fashion among different computers or processors to implement various aspects of the present invention.

Techniques described herein may be utilized with any type of relational database, such as, but not limited to, Microsoft SQL Server, Oracle, DB2, Teradata, Informix, Greenplum, Netezza, Hadoop, etc. Techniques described herein may also be utilized with any type of non-relational database, such as, but not limited to, MUMPS, IMS, IDMS, MongoDB, CouchDB, Couchbase Server, SimpleDB, DocumentDB, etc.

As one illustrative and non-limiting use case, techniques described herein may be applied to a system operating a relational database (e.g., SQL Server) and communicating with the VA's VistA system described above, which incorporates a MUMPS database. The techniques for reading and writing from a non-relational database as described herein may be applied to the MUMPS database within VistA to query and/or modify data within the MUMPS database and/or to perform synchronization between the MUMPS database and the relational database. Any suitable interface to execute commands within the MUMPS database and within VistA may be utilized. For instance, MUMPS commands may be executed within VistA by the system operating the relational database and/or the system may access an exposed interface of the MUMPS database (e.g., FileMan) to execute commands within MUMPS and/or VistA.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the technology described herein will include every described advantage.

Some embodiments may not implement any features described as advantageous herein and in some instances one or more of the described features may be implemented to achieve further embodiments. Accordingly, the foregoing description and drawings are by way of example only.

Also, various inventive concepts may be embodied as one or more methods, of which examples have been provided. The acts performed as part of a method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A system for synchronizing data between two databases, the system comprising:
    a relational database;
    at least one communication interface configured to communicate with a second system that comprises a non-relational database;
    at least one processor; and
    at least one processor-readable storage medium comprising processor-executable instructions that, when executed, cause the at least one processor to:
        determine, via the at least one communication interface, that first data stored in a first data field of the non-relational database has been modified;
        identify, using a data dictionary, one or more data fields of the relational database as corresponding to the first data field of the non-relational database;
        write the first data stored in the first data field of the non-relational database to the identified one or more data fields of the relational database;
        determine that second data stored in a second data field of the relational database has been modified;
        identify, using the data dictionary, one or more data fields of the non-relational database as corresponding to the second data field of the relational database;
        determine whether or not there is a defined dependency between the second data field of the relational database and the identified one or more data fields of the non-relational database; and
        in response to said determining that the second data stored in the second data field of the relational database has been modified, and when it is determined that there is a defined dependency between the second data field of the relational database and the identified one or more data fields of the non-relational database, generate one or more executable commands that, when executed by the non-relational database, write the second data stored in the second data field of the relational database to the identified one or more data fields of the non-relational database.

2. The system of claim 1, wherein determining that the first data stored in the first data field of the non-relational database has been modified comprises receiving an indication from the non-relational database that the at least one data field of the non-relational database has been modified.

3. The system of claim 1, wherein the processor-executable instructions, when executed by the at least one processor, further cause the at least one processor to, prior to writing the first data stored in the first data field of the non-relational database to the identified one or more data fields of the relational database, determine whether there is a conflict between the first data stored in the first data field of the non-relational database and third data stored in the one or more data fields of the relational database.

4. The system of claim 3, wherein the processor-executable instructions, when executed by the at least one processor, further cause the at least one processor to, when it is determined that there is a conflict between the first data stored in the first data field of the non-relational database and the third data stored in the one or more data fields of the relational database, request input via a user interface to resolve the conflict.

5. The system of claim 1, wherein the non-relational database is a MUMPS (Massachusetts General Hospital Utility Multi-Programming System) database.

6. The system of claim 1, wherein the non-relational database is a key-value database.

7. The system of claim 1, wherein the non-relational database is a document database.

8. The system of claim 1, wherein determining, via the at least one communication interface, that the first data stored in the first data field of the non-relational database has been modified comprises accessing an exposed interface of the non-relational database.

9. The system of claim 1, wherein the processor-executable instructions, when executed by the at least one processor, further cause the at least one processor to, subsequent to executing generated one or more executable commands on the non-relational database, determine whether or not the non-relational database has modified the second data written to the identified one or more data fields of the non-relational database.

10. A method for synchronizing data between a relational database and a non-relational database, the relational database and non-relational database being located in two different systems that are connected via a communication network, the method comprising:
    by at least one processor:
        determining that first data stored in a first data field of a non-relational database has been modified;
        identifying, using a data dictionary, one or more data fields of a relational database as corresponding to the first data field of the non-relational database;
        writing the first data stored in the first data field of the non-relational database to the identified one or more data fields of the relational database;
        determining that second data stored in a second data field of the relational database has been modified;
        identifying, using the data dictionary, one or more data fields of the non-relational database as corresponding to the second data field of the relational database;
        determine whether or not there is a defined dependency between the second data field of the relational database and the identified one or more data fields of the non-relational database; and in response to said determining that the second data stored in the second data field of the relational database has been modified, and when it is determined that there is a defined dependency between the second data field of the relational database and the identified one or more data fields of the non-relational database, generating one or more executable commands that, when executed by the non-relational database, write the second data stored in the second data field of the relational database to the identified one or more data fields of the non-relational database.

11. The method of claim 10, wherein determining that the first data stored in the first data field of the non-relational database has been modified comprises receiving an indication from the non-relational database that the at least one data field of the non-relational database has been modified.

12. The method of claim 10, further comprising, prior to writing the first data stored in the first data field of the non-relational database to the identified one or more data fields of the relational database, determining whether there is a conflict between the first data stored in the first data field of the non-relational database and third data stored in the one or more data fields of the relational database.

13. The method of claim 12, further comprising, when it is determined that there is a conflict between the first data stored in the first data field of the non-relational database and the third data stored in the one or more data fields of the relational database, requesting input via a user interface to resolve the conflict.

14. The method of claim 10, wherein the non-relational database is a MUMPS (Massachusetts General Hospital Utility Multi-Programming System) database.

15. The method of claim 10, wherein the non-relational database is a key-value database.

16. A method for performing a search of a non-relational database hosted by a first system and a relational database hosted by a second system, the method comprising:

by a relational database hosted by a second system:

receiving a search query via a user interface;

identifying, using a data dictionary, one or more data locations of the non-relational database as corresponding to first data fields of the search query;

executing, via a communication network that connects the first system and the second system, one or more commands within the first system to obtain first search result data from the identified one or more data locations of the non-relational database;

identifying, using the data dictionary, one or more data fields of the relational database as corresponding to second data fields of the search query;

obtaining second search result data from the identified one or more data locations of the relational database;

merging the second search result data from the identified one or more data fields of the relational database with the first search result data from the identified one or more data locations of the non-relational database; and presenting results of the search query via the user interface, said results comprising the merged second search result data from the identified one or more data fields of the relational database and the first search result data from the identified one or more data locations of the non-relational database, wherein the results of the search query include at least some data that is present in the relational database but not present in the non-relational database.

17. The method of claim 16, further comprising, prior to the step of presenting, converting a format of the data from the identified one or more data locations of the non-relational database into a data format that includes attribute-value pairs.

18. The method of claim 16, wherein the non-relational database is a MUMPS (Massachusetts General Hospital Utility Multi-Programming System) database.

19. The method of claim 16, wherein the non-relational database is a key-value database.

20. The method of claim 16, wherein the non-relational database is a document database.

* * * * *